United States Patent [19]

Hatakeyama et al.

[11] Patent Number: 4,596,310

[45] Date of Patent: Jun. 24, 1986

[54] DRIVING APPARATUS FOR AN ENERGY ACCUMULATOR OF A CIRCUIT BREAKER

[75] Inventors: Shunichi Hatakeyama; Kiyohisa Yoshigae, both of Kanagawa, Japan

[73] Assignee: Fuji Electric Company, Ltd., Kawasaki, Japan

[21] Appl. No.: 599,160

[22] Filed: Apr. 11, 1984

[30] Foreign Application Priority Data

Apr. 12, 1983 [JP] Japan .................................. 58-64097

[51] Int. Cl.[4] ........................ F03D 1/08; G05G 17/00; H01H 3/30

[52] U.S. Cl. ........................................ 185/40 R; 74/2; 74/577 S; 74/577 M; 74/625; 200/153 SC

[58] Field of Search ...................... 74/2, 577 S, 577 M, 74/625; 185/40 R; 200/153 SC

[56] References Cited

U.S. PATENT DOCUMENTS

| | | | |
|---|---|---|---|
| 405,469 | 6/1889 | Glenn | 74/577 S |
| 3,585,330 | 6/1971 | Bould | 185/40 R X |
| 3,689,721 | 9/1972 | McGuffie | 185/40 R X |
| 4,095,676 | 6/1978 | Howe et al. | 200/153 SC X |
| 4,110,582 | 8/1978 | Barkan | 74/2 X |
| 4,409,449 | 10/1983 | Takano et al. | 200/153 SC |

*Primary Examiner*—Allan D. Herrmann

*Attorney, Agent, or Firm*—Finnegan, Henderson, Farabow, Garrett & Dunner

[57] ABSTRACT

A drive mechanism for an energy accumulator of a stored energy circuit breaker includes a toothed ratchet wheel intermittently coupled to a shaft connected to an energy accumulating spring through a crank arm. A pair of drive levers are rotatably mounted upon the shaft and support a U-shaped drive claw and a pawl. The toothed periphery of the ratchet includes a gap wherein teeth are not formed. A drive spring biases the drive claw and pawl into engagement with the periphery of the ratchet, with the ratchet being positioned in the gap when the energy accumulating spring is fully charged. The drive levers are connected to one end of a connecting rod, the other end of which is connected to a motor assembly which causes reciprocating motion of the connecting rod when the motor assembly is energized. A lock means selectively prevents the shaft from rotating when the energy accumulating spring is fully charged. Activation of the lock means allows rotation of the shaft and discharge of the spring to operate on associated circuit breaker. The motor assembly is then automatically energized to rotate the ratchet via the connecting rod, friction lever and the drive claw to recharge the energy accumulating spring.

10 Claims, 11 Drawing Figures

DRIVING APPARATUS FOR AN ENERGY ACCUMULATOR OF A CIRCUIT BREAKER

BACKGROUND OF THE INVENTION

The invention relates to a driving apparatus used in an energy accumulator of the type having an accumulating shaft and a ratchet intermittently coupled to the shaft, the ratchet being moved stepwise by a drive claw actuated by reciprocating motion.

A driving apparatus of this type must be quickly ready at any time to supply mechanical energy required for closing an electric current breaker in response to a command. Such driving apparatus is required to exhibit positive operation and be economical in cost.

A driving apparatus of this type for use with a ratchet is especially advantageous when a relatively large amount of energy is supplied by a small amount of force. When the force is applied, the ratchet is stepwise rotated by reciprocating motion of a drive claw engaged with the teeth of the ratchet. The ratchet must be adapted so that the drive claw and an electric motor for moving the latter are freed from driving when the ratchet achieves the condition in which an energy accumulating spring is fully charged. It is desired to minimize load on the teeth of the ratchet and on the claw engaged with the teeth of the ratchet, caused by rapid movement of the ratchet, and to avoid further stepwise movement of the claw when the accumulating spring is sufficiently charged to close the breaker.

In light of the aforementioned requirements, it is an object of the invention to provide a driving apparatus used in an energy accumulator for operating a breaker, which is inexpensive and reliable in its action.

SUMMARY OF THE INVENTION

In order to accomplish the object as aforementioned, the present invention is intended to provide a driving apparatus which comprises a shaft; an energy accumulating spring connected to the shaft and adopted to have energy stored therein; a ratchet mounted on the shaft and intermittently coupled thereto and formed with teeth on its periphery, including a gap therein; drive means for rotating the ratchet; support claws for preventing the ratchet from reversing; and lock means for selectively preventing rotation of the shaft when the energy accumulating spring is fully charged. The drive means includes a drive lever rotatably mounted on the shaft, a connecting rod movably connected to the drive lever, motor means connected to the connecting rod for imparting reciprocating motion to the connecting rod, a drive claw movably mounted to the drive lever and biased toward the ratchet periphery in the gap when the energy accumulating spring is fully charged. The drive means further includes a pawl movably mounted on the drive lever and biased into engagement with the ratchet teeth when the energy accumulating spring is fully charged. The driving apparatus is designed so that stepwise movement of the ratchet is effected by only a simple structure such as the pawl which is mounted with the drive claw on a common shaft and which is engaged by a common torsion spring with the teeth of the ratchet in a simple and positive manner, thereby providing greater contact force. This arrangement involves advantages in that a distance between the center of the accumulating shaft and a position where the pawl is in contact with the ratchet is increased to result in greater turning moment. In this connection, it is noted that the support claw is limited in a preferred embodiment by a breaker operating shaft for range of rotation and is mounted to support levers rotatable to the accumulating shaft, and that the ratchet may be manually driven by the support lever with the support claws serving as drive means.

BRIEF DESCRIPTION OF THE DRAWINGS

FIG. 1 is a side view of the apparatus with parts partially broken away;

FIG. 2 is front view of the apparatus shown in FIG. 1;

FIG. 3 is an enlarged section taken along the line X—X of FIG. 2;

FIG. 4 is a block diagram schematically showing a connection explanatory of the operation of the apparatus;

FIG. 5 is a side view of the instant apparatus;

FIG. 6 is a frontal section taken along the line VI—VI of FIG. 5.

DESCRIPTION OF THE PREFERRED EMBODIMENT

One form of prior art driving apparatus of this type with a motor used in an energy accumulator for operating an associated circuit breaker, known as a stored energy breaker, is shown in FIG. 1 through FIG. 4.

Figure 1:
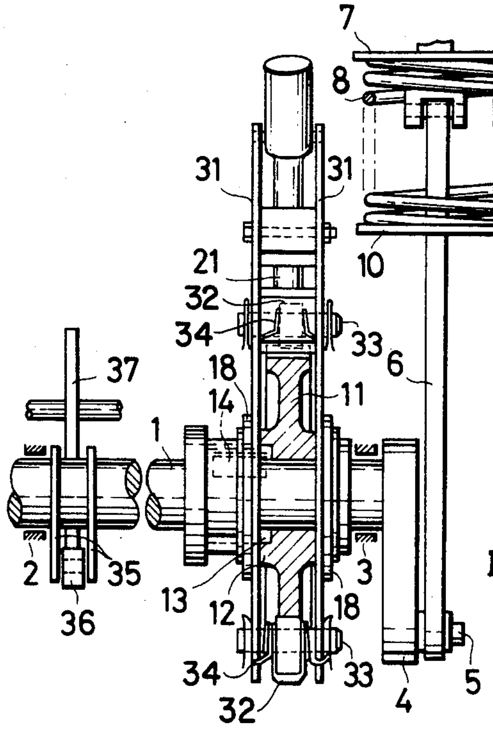
FIG. 1 PRIOR ART
FIGS. 1 through 4 each show prior art driving apparatus in an accumulator for operating a breaker; that is.
Figure 2:
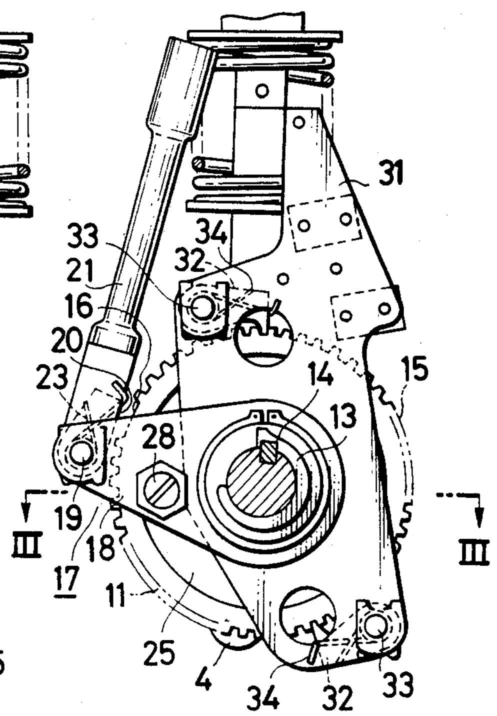
FIG. 2 PRIOR ART

Referring to FIG. 1, numeral 1 is a rotary accumulating shaft, which is rotatably supported by bearings 2,3. A crank arm 4 is attached to the shaft 1 on the right of the drawing. A connecting rod 6 is secured by a crank pin 5 to the crank arm 6. A movable spring shoe 7 is mounted on the connecting rod 6 on its upper end whereas an accumulating spring 8 for closing the breaker is interposed between the movable spring shoe and a stationary spring shoe 10. A ratchet 11 is rotatably mounted on the accumulating shaft 1 and includes a boss 12 which is provided with an arcuated notch 13 of about 270° as shown in FIG. 2. A key 14 fitted in the shaft 13 is engaged with the recess 13 and forms a specific intermittent coupling to the latter. The ratchet 11 includes teeth 15 on its periphery except for a certain omission, or gap, 16.

The ratchet 11 is incrementally driven by a drive means 17 as will be described hereinafter. Drive levers 18 are rotatably so mounted bilaterally of the ratchet 11 as to hold the latter therebetween. A link shaft 19 is mounted to extend between the levers 18 and carries a drive claw 20 rotatably mounted on the shaft 19. A drive rod 21 connected to the link shaft 19 is reciprocally moved by an eccentric wheel via an electric motor 22 schematically shown in FIG. 4. The drive claw 20 is urged by a drive spring 23 in the direction of the teeth 15 and acts thereon. Friction members 24 are mounted on the levers 18. The friction members 24 as well as a compression spring 26 are held in a common case 27 and are so disposed as to urge the friction members 24 against friction surfaces 25 bilaterally of the ratchet 11. Compressive force is regulated by a screw 28.

Two support claws 32 are mounted on link shafts 33 of a support lever 31 which is in turn rotatably mounted on the accumulating shaft 1. The support claws 32 are located opposite each other on the periphery of the ratchet 11 and are urged by a spring 34 in the direction of the teeth 15 and act on the teeth 15 to prevent the ratchet 11 from reversing.

Lock means is provided to lock the accumulating shaft 1 when the accumulating spring 8 stores the maximum energy therein. This lock means includes a roller 36 on the left of FIG. 1 and shown in FIG. 4, a lever 35 secured to the accumulating shaft 1, and a lock lever 37 which is rotatably supported and whose end surface 38 abuts against the roller 36 in a lock condition to prevent the accumulating shaft from being rotated by the lever 35. When the lever 35 is in this position, a power source switch 39 for the electric motor 22 is open. Under such conditions, it is noted that the crank arm 4 is in a position slightly beyond the dead point downward as shown in FIG. 2 whereas the drive claw 20 is set to reach the gap 16 in the teeth 15.

Figure 3:
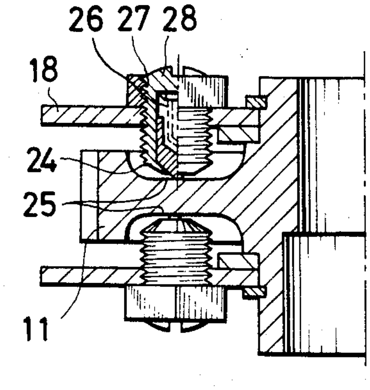
FIG. 3 PRIOR ART
Figure 4:
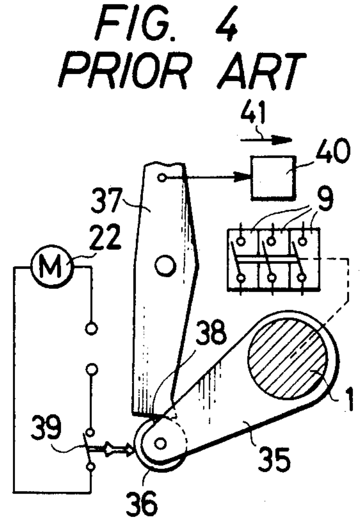
FIG. 4 PRIOR ART

When it is desired to close contacts 9 for the breaker schematically shown in FIG. 4, the lock lever 37 is pulled by, for example, an electromagnetic means 40 in the direction of the arrow 41. This disengages the end surface 38 of the lock lever 37 from the roller 36 to permit the accumulating shaft 1 to rotate clockwise. At this time, the accumulating shaft 1 starts from a position where the key 14 is in the notch 13 to rotate through an angle of more than 180° independently of the ratchet 11. In this manner, the accumulating spring 8 rotates the accumulating shaft 1 through about 180° via the connecting rod 6 and the crank arm 4 to close the breaker. At the same time, the roller 36 of the lever 35 fixed to the accumulating shaft 1 is clockwise rotated from the position shown in FIG. 4 to then close the switch 39, starting the electric motor 22. Thus, reciprocating motion of the lever 18 through the drive rod 21 is initiated for next energy accumulation. At this time, the drive claw 20 is positioned in the gap 16 of the teeth 15 of the ratchet 11 to thus provide no action thereon. Notwithstanding, the friction segment 24 formed on the lever 18 as shown in FIG. 3 applies a friction-implemented driving torque to the ratchet 11. The direction of the driving torque alternates in response to reciprocating motion of the drive rod 21. The support claw 32, however, prevents the ratchet 11 from rotating in a counterclockwise direction to permit only a clockwise driving torque, thereby moving the ratchet 11 in steps in a clockwise direction. This eventually allows the drive claw 20 to engage the teeth 15 of the ratchet 11, and the latter is rotated by the teeth 15. At this time, the key 14 is clockwise displaced from the position of FIG. 2 (where the accumulating spring 8 is shown in a fully charged condition). Thus, the ratchet 11 may be incrementally moved and idled until the end face of the notch 13 is moved into engagement on the key 14. After the time when such engagement is made, the accumulating shaft is moved to follow the ratchet 11 and drive the crank arm 4 and the connecting rod 6, thus charging the accumulating spring 8 to gradually store energy therein, until the apparatus reaches the position shown in FIGS. 1 and 2.

With the arrangement as made in this manner, the electric motor is assured to be started in a substantially non-loaded condition under which only the drive rod, drive lever, and the drive claw are moved, thereby imposing no shock upon the apparatus. Disadvantages of such prior art apparatus are, however, that since it is fabricated so that the ratchet is frictionally moved in steps by urging the friction segment under the influence of the compression spring against a friction surface on the wheel side of the ratchet, frictional force on the friction surface changes due to the alternate conditions of sliding friction. This results in less positive action. Such arrangement for stepwise movement requires a large number of parts and a complex construction.

Figure 5:
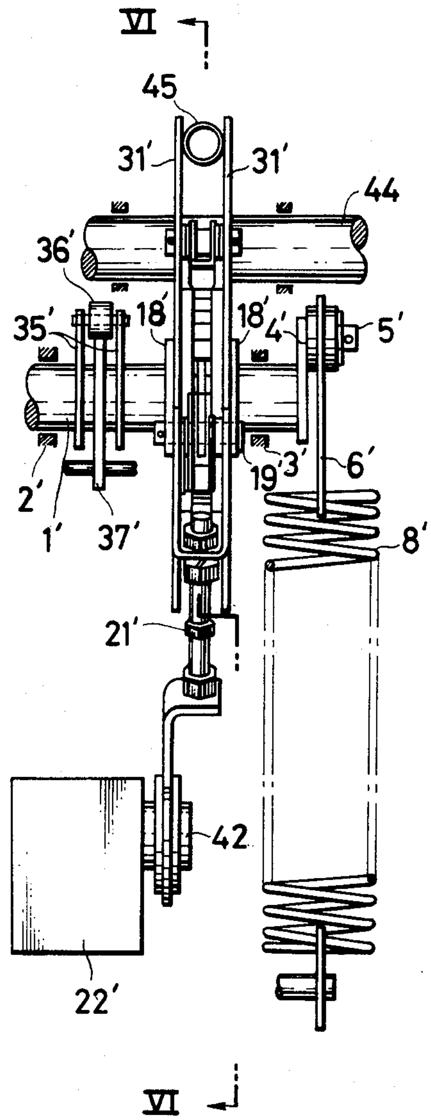
FIGS. 5 and 6 each show one embodiment of a driving apparatus in accumulator for operating a breaker, made in accordance with the invention; that is.
Figure 6:
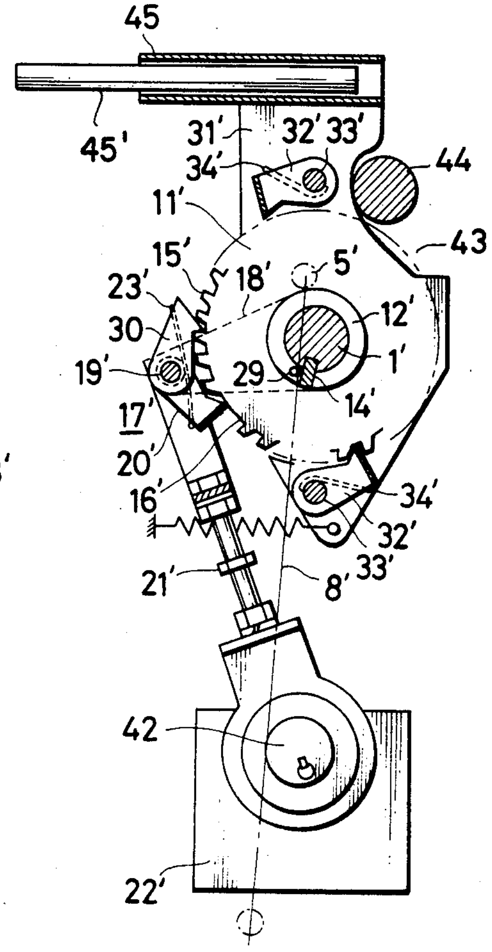
Figure 7A:
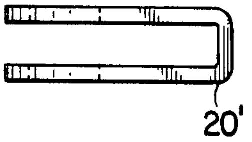
FIGS. 7A, 7B, 7C are close up views of drive claw 20'.
Figure 7B:
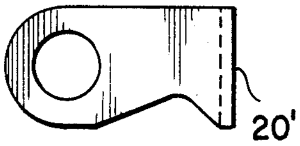
Figure 7C:
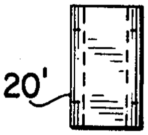
Figure 8A:
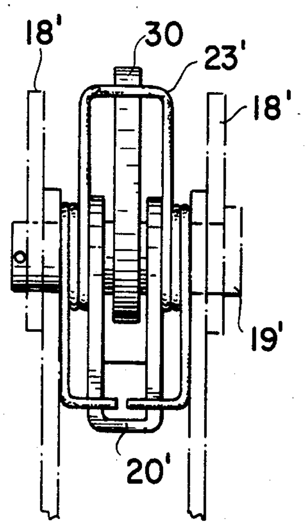
FIGS. 8A and 8B are detailed views showing a hook-shaped pawl and its cooperation with a drive claw.
Figure 8B:
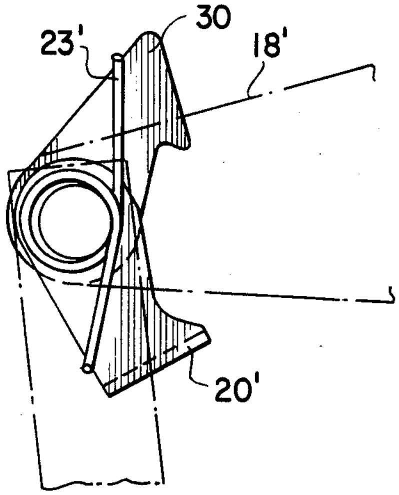

Now, the embodiment of the present invention will be detailed by reference to FIGS. 5 and 6. Referring to FIGS. 5 and 6, an energy accumulating shaft 1' of an energy accumulator for operating a breaker is rotatably supported by bearings 2', 3' similar to those of the prior art shown in FIGS. 1 and 2 and is adapted to have energy stored by a crank arm 4', crank pin 5', and a connecting rod 6' in an accumulating spring 8' for closing the breaker. A ratchet 11' similar to the conventional one is provided on its entire periphery with teeth 15' except for a gap 16' and is rotatably mounted on the accumulating shaft 1'. In this instance, it is noted that the ratchet 11' is intermittently coupled to a key 14' fitted into the accumulating shaft 1' by a simple arrangement that a pin 29 is fixed to extend from a boss 12'.

The invention includes drive means which in the preferred embodiment comprises drive means 17' for rotating the ratchet 11'. Drive means 17' is designed in the same manner as in the prior art so that a link shaft 19' is interposed between drive levers 18' which are rotatably mounted on the shaft 1' to hold the ratchet 11' between the opposite sides thereof. The drive levers 18' are coupled to a connecting rod 21' adapted for reciprocating movement. The invention also includes motor means for imparting reciprocating motion to the connecting rod 21' and in the preferred embodiment comprises an electric motor 22', an eccentric wheel 42, and means for deenergizing the motor 22' when the energy accumulating spring is fully charged. In the preferred embodiment, the deenergizing means includes a lever 35, a roller 36, and a switch 39, as shown in FIG. 4. Rotation of the electric motor 22' is converted into such reciprocating movement of the connecting rod 21' by the eccentric wheel 42. This arrangement is, however, different from the prior art in that the drive means 17' includes a drive claw 20' and a pawl 30 mounted on the link shaft 19', instead of employing the conventional friction segment. More specifically, the drive claw 20' is shaped into a U-form having a pair of legs and a curved portion, and is provided on its curved portion with a claw. The pawl 30 is adapted to have its one end inserted in the opening of the legs of the drive claw 20' and is connected as a unit by the link shaft 19' passing through the legs and one end of the friction lever 30 and is so arranged in a hook-shape as to embrace the periphery of the ratchet. A torsion drive spring 23' trained around the link shaft 19' includes its opposite ends which urge the claw of the drive claw 20' and the other end of the pawl 30 against the teeth 15'.

The invention includes means for preventing reverse rotation of the ratchet 11' and in the preferred embodiment comprises a pair of support claws 32' similar to the ones of the prior art mounted on link shafts 33' attached to the opposite ends of a support lever 31'. The support lever 31' is rotatably mounted on the accumulating shaft 1' and has a pipe 45 fixed to one end thereof. The support claws 32' face the ratchet 11' on the periphery thereof to hold the ratchet 11' therebetween and are urged by a spring 34' in the direction of the teeth. In this embodiment of the invention, the lever 31' is provided with means for limiting the range of rotation of the lever 31' comprising a notch 43 the end surface of which is adapted to abut against an operative shaft 44 for opening and closing the breaker. A handle, if mounted within the pipe 45, may serve as a removeable manual operating lever to manually reciprocally rotate the lever 31' to thus manually drive the support claws 32' and the drive claw 20' which serve as drive claw means and support claw means, respectively. In this manner, manual operation of the pipe 45 causes the support claws 32' to incrementally rotate the ratchet 11' and charge the accumulating spring 8'.

A lock means is provided for selectively preventing rotation of the accumulating shaft 1' when the accumulating spring 8' is in the maximum energy stored condition (i.e., is fully charged). The lock means of the preferred embodiment is identical to the prior art lock means shown schematically in FIG. 4, except the rotation of the shaft 1' is in a direction opposite to that of the shaft 1 in FIG. 4. The lock means of the preferred embodiment thus comprises the roller 36', the levers 35' fixed to the accumulating shaft 1' and the lock lever 37' having an end face (not shown, similar to end face 38) to lock the accumulating shaft 1'. At this moment, a power source switch (not shown, similar to switch 39) is open to deenergize the electric motor 22'.

Since the apparatus is operated in the same manner as that of the prior art as previously mentioned, description will be mainly directed to what is different from the prior art. In FIGS. 5 and 6, the crank arm 4' is positioned slightly above the dead point when the accumulating spring 8' is fully charged, and the accumulating shaft 1' is locked in the same manner as shown for the accumulating shaft 1 in FIG. 4.

To close the contacts of the breaker, the lock lever 37' is pulled by an electromagnetic device (not shown, similar to device 40) to release the roller 36' from the lock lever 37' and discharge the energy stored in the accumulating spring 8'. The accumulating shaft 1' is rotated through about 180° by the bias of the accumulating spring 8' to close the contacts. At this time, the levers 35' are rotated with the accumulating shaft 1' to close the switch, starting the electric motor 22'. Then, the connecting rod 21' and the lever 18' accordingly initiate reciprocating motion to start the next energy storing operation. On the other hand, the drive claw 20' is in the gap 16' from the teeth 15' of the ratchet 11' but not acting thereon, instead, to intend to reciprocally move the pawl 30 as mounted as well as the drive claw 20', having the ratchet 11' reciprocally moved. At which time, the pawl 30 exercises a small drive moment in a clockwise direction and great drive moment in a counterclockwise direction depending upon its configuration. However, clockwise rotation is prevented by the support claw 32' to allow only counterclockwise drive moment, thus moving the ratchet in steps counterclockwise. This then allows the drive claw 20' to engage the teeth 15', and thereafter, the ratchet 11' is rotated by the drive claw 20'. The ratchet 11' is, however, incrementally moved and idled until the pin 29 abuts against the key 14'. The accumulating shaft 1' is not moved to follow the ratchet 11' until the pin 29 is brought into contact with the key 14', thereby driving the crank arm 4', connecting rod 6', and the accumulating spring 8' to the respective positions shown in FIGS. 5 and 6 to charge the accumulating spring 8' and store energy therein.

It is noted that the instant apparatus may be adapted so that if the electric current from a control power source is interrupted and a circuit for the electric motor malfunctions, the handle is inserted into the pipe 45 to manually rotate the ratchet 11' to have the support claws 32' and the drive claw 20' acted as a drive claw and support claws to manually store energy in the accumulating spring 8'. In this instance, the support claws 32' are controlled so that the end face of the notch 43 in the lever 31' is moved within the range of the operative shaft 44 being in engagement with the end face.

As aforementioned, according to the invention, the drive means for rotating the ratchet 11' at the beginning of storing energy is composed of the pawl 30 and is mounted on the link shaft 19' integrally with the drive claw 20 , and the pawl 30 as well as the drive claw 20' is adapted to urge against the teeth 15' of the ratchet 11' by the torsion spring 23' for urging the drive claw 20' in the direction of the ratchet 11'. This simplifies the arrangement of the drive means. Further, the pawl 30 is urged against the teeth 15' of the ratchet 11' to provide powerful frictional force, and the radius of rotation of the pawl 30 is larger to magnify its action with small force to strongly act on the ratchet 11', thereby achieving the objective. The instant apparatus is reliable due to its electrical and manual operation.

What is claimed is:

1. Driving apparatus for an energy accumulator in a stored energy circuit breaker, comprising:

a shaft;

an energy accumulating spring connected to said shaft, rotation of said shaft causing said energy accumulating spring to charge and energy to be stored therein;

a ratchet rotatably mounted on said shaft and intermittently coupled thereto, said ratchet having teeth formed in the periphery thereof such that a portion of said ratchet periphery has a gap not having said teeth formed therein;

drive means for rotating said ratchet, comprising a drive lever rotatably mounted on said shaft, a connecting rod movably connected to said drive lever, motor means connected to said connecting rod for imparting reciprocating motion to said connecting rod, a drive claw moveably mounted on said drive lever and biased toward said ratchet periphery in said gap when said energy accumulating spring is fully charged, and a pawl moveably mounted on said drive lever and biased into engagement with said teeth when said energy accumulating spring is fully charged;

means for preventing reverse rotation of said ratchet; and lock means for selectively preventing rotation of said shaft when said energy accumulating spring is fully charged, operation of said lock means permitting rotation of said shaft to discharge said energy accumulating spring and energize said motor to cause reciprocating motion of said connecting rod and repeated engagement of said pawl with said teeth to cause incremental rotation of said ratchet;

said incremental rotation being disposed to move said gap away from said drive claw and bring said drive claw into engagement with said teeth to produce continued incremental rotation of said ratchet and couple said ratchet to said shaft to charge said energy accumulating spring.

2. Apparatus as recited in claim 1 wherein said motor means comprises an electric motor and means for deenergizing said motor when said energy accumulating spring is fully charged.

3. Apparatus as recited in claim 1 comprising a support lever rotatably mounted on said shaft and wherein said means for preventing reverse rotation of said ratchet comprises a pair of support claws mounted upon said support lever.

4. Apparatus as recited in claim 3 comprising means for limiting the rotation of said support lever.

5. Apparatus as recited in claim 4 wherein said means for limiting rotation of said support lever comprises the operating shaft of an associated circuit breaker.

6. Apparatus as recited in claim 5 comprising a manual operating lever connected to said support lever, operation of said manual operating lever causing said support claw to engage said teeth and rotate said ratchet to manually charge said energy accumulating spring.

7. Apparatus as recited in claim 1 wherein said drive claw is formed in a U-shape having a pair of legs connected by a curved portion, said apparatus comprising a link shaft connecting said legs to said drive lever, and said curved portion being adapted to engage the periphery of said ratchet.

8. Apparatus as recited in claim 7 wherein said friction lever is formed into a hook shape and has one end connected between said legs by said link shaft and its other end biased into engagement with said ratchet periphery.

9. A driving apparatus for an energy accumulator of a stored energy circuit breaker, comprising:

an accumulating shaft;

an accumulating spring connected to said accumulating shaft and adapted to receive stored energy therein;

a ratchet intermittently coupled to said shaft and having teeth formed on its periphery, said teeth including a gap formed therein over a portion of said ratchet periphery;

drive means for converting rotation of an electric motor to reciprocating motion to produce stepwise movement of said ratchet; said drive means including a drive claw formed into a U-shape and having a pair of legs, a curved portion, and a opening between said legs; said drive means further including a pawl having first and second ends, said first end being inserted into said drive claw opening, a link shaft passing through said pawl and both legs of said drive claw, and a drive spring biasing said drive claw and said pawl second end in the direction of said teeth; said drive claw being positioned in said gap and said pawl second end being positioned to engage said teeth when said accumulating spring is in a fully charged condition; and means for preventing said ratchet from rotating in a reverse direction.

10. A driving apparatus as described in claim 9 further comprising a support lever rotatably mounted on said accumulating shaft and supporting said support claws, said support lever being positioned with respect to an operating shaft of an associate circuit breaker so as to limit movement of said support lever, said support lever being adapted for manual rotation such that said support claws act as drive means to rotate said ratchet.

* * * * *